(12) United States Patent
Suligoj et al.

(10) Patent No.: US 11,030,511 B2
(45) Date of Patent: Jun. 8, 2021

(54) HOUSING FOR IDENTIFICATION DEVICE

(71) Applicant: ASSA ABLOY AB, Stockholm (CH)

(72) Inventors: Eric Suligoj, Froideville (CH);
Jean-Miguel Robadey, Bossonnens (CH); Elies Ennabli, Lausanne (CH); Gilles Horisberger, Granges (CH)

(73) Assignee: ASSA ABLOY AB, Stockholm (SE)

( * ) Notice: Subject to any disclaimer, the term of this patent is extended or adjusted under 35 U.S.C. 154(b) by 49 days.

(21) Appl. No.: 16/606,509

(22) PCT Filed: Apr. 20, 2018

(86) PCT No.: PCT/IB2018/000501
§ 371 (c)(1),
(2) Date: Oct. 18, 2019

(87) PCT Pub. No.: WO2018/193309
PCT Pub. Date: Oct. 25, 2018

(65) Prior Publication Data
US 2021/0117746 A1    Apr. 22, 2021

Related U.S. Application Data

(60) Provisional application No. 62/488,296, filed on Apr. 21, 2017.

(51) Int. Cl.
*G06K 19/07* (2006.01)
*G06K 19/077* (2006.01)

(52) U.S. Cl.
CPC .................. *G06K 19/0776* (2013.01)

(58) Field of Classification Search
CPC .................................................. G06K 19/0776
(Continued)

(56) References Cited

U.S. PATENT DOCUMENTS 6,021,949 A * 2/2000 Boiron ................. G06K 19/047
235/492
8,325,047 B2 * 12/2012 Marur .............. G06K 19/07749
340/572.8
(Continued)

FOREIGN PATENT DOCUMENTS

| CN | 102623215 B | 5/2014 |
| CN | 110678880 | 1/2020 |

(Continued)

OTHER PUBLICATIONS

"International Application Serial No. PCT/IB2018/000501, International Search Report dated Sep. 12, 2018", 3 pgs.
(Continued)

*Primary Examiner* — Daniel A Hess
(74) *Attorney, Agent, or Firm* — Schwegman Lundberg & Woessner, P.A.

(57) ABSTRACT

A device for holding a radio frequency identification (RFID) device and securing the RFID device to another object, particularly an object having a curved or irregular shaped surface. The device includes multiple locking plates that interleave or overlap within slots formed in the base of a container holding an RFID device. One of more locking members integral with the locking plates assist in securing one locking plate to another and resist separating the locking plates once installed. Flanges or extensions extend outside of the base and provide structure to secure the device to an object to be identified.

20 Claims, 13 Drawing Sheets

(58) Field of Classification Search
USPC .......................................................... 235/492
See application file for complete search history.

(56) References Cited

U.S. PATENT DOCUMENTS

| | | | |
|---|---|---|---|
| 10,166,707 B2* | 1/2019 | Chang | G06K 19/07773 |
| 2002/0076859 A1* | 6/2002 | Johnson | H01L 23/293 |
| | | | 438/126 |
| 2003/0076662 A1* | 4/2003 | Miehling | G06K 19/07724 |
| | | | 361/760 |
| 2004/0110323 A1* | 6/2004 | Becker | H01L 21/56 |
| | | | 438/127 |
| 2004/0178109 A1* | 9/2004 | Turner | G06K 19/02 |
| | | | 206/525 |
| 2004/0237299 A1* | 12/2004 | Stelzl | H01L 21/50 |
| | | | 29/855 |
| 2006/0087440 A1* | 4/2006 | Klein | G09F 21/02 |
| | | | 340/573.3 |
| 2011/0017833 A1 | 1/2011 | Cullen et al. | |
| 2011/0226861 A1* | 9/2011 | Warther | G06K 19/07749 |
| | | | 235/492 |

FOREIGN PATENT DOCUMENTS

| | | |
|---|---|---|
| EP | 2221754 A1 | 8/2010 |
| WO | WO-2008107638 A1 | 9/2008 |
| WO | WO-2018193309 A1 | 10/2018 |

OTHER PUBLICATIONS

"International Application Serial No. PCT/IB2018/000501, Written Opinion dated Sep. 12, 2018", 5 pgs.

"International Application Serial No. PCT/IB2018/000501, International Preliminary Report on Patentability dated Oct. 31, 2019", 7 pgs.

"European Application Serial No. 18734935.2, Response to Communication pursuant to Rules 161(1) and 162 EPC filed May 12, 2020", 26 pgs.

* cited by examiner

HOUSING FOR IDENTIFICATION DEVICE

CROSS-REFERENCE TO RELATED APPLICATIONS

This application claims the benefit under 35 U.S.C. § 371 to International PCT Application Serial No. PCT/IB2018/000501, filed Apr. 20, 2018, which claims priority to U.S. Provisional Patent Application Ser. No. 62/488,296, filed Apr. 21, 2017, each of which is incorporated herein by reference in its entirety.

FIELD OF THE INVENTION

The present disclosure relates to a housing for securing a radio frequency identification device to an object, including but not limited to beer kegs.

BACKGROUND OF THE INVENTION

For many reasons, it is desirable to be able to attach a radio frequency identification device to a body. Among these reasons is inventory and tracking control. It is also desirable to attach the RFID device in a manner that inhibits removal and that protects the RFID device from damage during intended use. Beer kegs present one example of the application of the device of the present disclosure. Beer kegs are typically constructed of stainless steel and have a curved or cylindrical shape. The beer kegs are also subject to physical abuse and wet environments. There is a need to provide a method and apparatus for attaching an RFID device to a beer keg in manner that withstands physical and environmental wear and tear while providing effective read range and operability.

SUMMARY OF THE INVENTION

According to embodiments of the present disclosure, a device is provided having a housing defining an interior cavity with one open side in communication with the interior cavity, and a cover for enclosing the interior cavity. The cavity is configured to hold a wireless identification device, for example a radio frequency identification device. A base is then secured to the cover and housing. The outer surface of the base may be contoured to interface with the object to be identified. For example, the outer surface may be curved to match the surface of the device to be identified, such as a beer keg. In one embodiment, the base is overmolded to the cover and housing.

According to aspects of the present disclosure, at least one slot extends completely though the base from a first side to the opposite side. Multiple slots may be utilized as will be understood by a person of ordinary skill in the art upon review of the present disclosure. The at least one slot is configured to receive two locking plates. One locking plate is inserted from a first side of the base, the second locking plate is inserted from the opposite side of the base. A locking plate comprises a locking sheet, a flange or wing that extends outwardly from the base when installed, and a segment or band interconnecting the locking sheet and the flange. According to aspects of the disclosure, the locking plate is metal, preferably the same or similar to the metal body of the object to be identified. The flange may also be contoured, like the outer surface of the base, to match or nearly match the surface of the object to be identified. As previously noted, one application is a beer keg. By making the locking plate, including the flange, from stainless steel, the flange is easily welded to the metal surface of a keg. The locking plate may be made from other metals or alloys, or non-metals, depending upon the type of device to be identified and how it is made.

Also, according to aspects of the present disclosure, the locking sheet of each locking plate is provided with locking features to secure the locking plates to each other and to inhibit withdrawal or removal of the locking sheets from the slot. More specifically, each locking sheet may be provided with one or more protrusions, bumps or dimples. The bumps in one locking sheet are aligned to nest with the bumps in the second locking sheet to interlock the two locking sheets together once each locking plate is fully inserted into a slot. In addition, the extent to which the bumps extend outwardly from the locking sheet may also create a frictional engagement between the interlocking locking plates and the surrounding surfaces of the slot, and thereby inhibit removal of the locking plates from the slot. Further still, the locking sheets may also include one or more tabs that also extend outwardly to engage and form a frictional engagement with the surrounding surfaces of the slot and inhibiting removal of the locking plates from the slot. As should also be appreciated, once the locking plates are fully assembled with the base and the cover and secured to the housing, the act of welding the flanges of the locking plates to the body of the beer keg will further prevent removal of the locking plates from the base.

According to aspects of the present disclosure, one embodiment of a device for holding a radio frequency identification device comprises a housing having a first interior cavity and one open side in communication with the first interior cavity; a cover having an inner surface and an outer surface and configured to enclose the first interior cavity; a base extending from the outer surface of the cover and secured at least to the housing, the base having an outer surface configured to interface with an object to be identified, the base further having two opposed and spaced apart side walls and two opposed and spaced apart end walls extending between the side walls, and at least one slot extending through the base from a first side wall to the opposite side wall; a first locking plate configured to fit within the at least one slot from a first side of the base, the first locking member having at least a first sheet portion, a first locking member, a second locking member, and a first flange extending along one edge of the first locking member; and a second locking plate configured to fit within the at least one slot from the opposite side of the base, the second locking member having at least a second sheet portion, a third locking member, a fourth locking member, and a second flange extending along one edge of the second locking member. When the first and second sheet portions of the first and second locking plates are positioned in the at least one slot the first and second sheet portions overlap, and the first flange extends along at least a portion of the first side wall of the base and the second flange extends along at least a portion of the opposite side wall of the base whereby the first and second flanges are configured to engage the object to be identified.

According to aspects of the present disclosure, in at least one embodiment of the device for holding an RFID device the first sheet portion of the first locking plate comprises at least a first locking member and the second sheet portion of the second locking member comprises at least a second locking member, and when the first and second sheet portions of the first and second locking plates are positioned in the at least one slot the first locking member of the first locking plate interlocks with the second locking member of the second locking plate to secure the first and second locking plates together.

According to aspects of the present disclosure, in at least one embodiment of the device for holding an RFID device the first sheet portion of the first locking plate comprises at least a third locking member and the second sheet portion of the second locking member comprises at least a fourth locking member, and when the first and second sheet portions of the first and second locking plates are positioned in at least one slot the third locking member of the first locking plate and the fourth locking member of the second locking plate frictionally engage a surface of the slot to inhibit removal of the first and second locking members from the at least one slot.

According to aspects of the present disclosure, in at least one embodiment of the device for holding an RFID device multiple slots extend through the base from a first side wall to the opposite side wall, and the first and second locking plates each comprise multiple locking sheets, and at least one locking sheets of the first locking plate overlaps with at least one locking sheet of the second locking plate and wherein at least one of the at least one overlapping locking sheets comprises a locking member that secures the first locking plate to the second locking plate.

According to aspects of the present disclosure, in at least one embodiment of the device for holding an RFID device each of multiple locking sheets of the first locking plate overlaps with a locking sheet of the second locking plate.

According to aspects of the present disclosure, in at least one embodiment of the device for holding an RFID device at least a plurality of multiple locking sheets of the first locking plate include a locking member that engages a locking member associated with a locking sheet of the second locking plate.

According to aspects of the present disclosure, in at least one embodiment of the device for holding an RFID device the first locking member is a first bump extending from the first sheet portion and the second locking member of the second sheet portion is a second bump extending from the second sheet portion, and the first bump frictionally engages the second bump.

According to aspects of the present disclosure, in at least one embodiment of the device for holding an RFID device at least one of the first and second bumps frictionally engage a surface of a slot in the base.

According to aspects of the present disclosure, in at least one embodiment of the device for holding an RFID device multiple locking members are associated with both the first and second sheet portions.

According to aspects of the present disclosure, in at least one embodiment of the device for holding an RFID device the first locking member of the first locking plate is a tab and the second locking member of the second locking plate is a slot, and the tab extends through the slot when the first and second sheet portions are positioned in the at least one slot.

According to aspects of the present disclosure, in at least one embodiment of the device for holding an RFID device multiple second locking members are associated with both the first and second sheet portions.

According to aspects of the present disclosure, in at least one embodiment of the device for holding an RFID device a radio frequency identification device positioned in the cavity of the housing.

According to aspects of the present disclosure, in at least one embodiment of the device for holding an RFID device the bumps are partially spherical.

According to aspects of the present disclosure, in at least one embodiment of the device for holding an RFID device the outer surface of the base is curved.

According to aspects of the present disclosure, in at least one embodiment of the device for holding an RFID device the sheet portions of the locking plates are substantially planar.

According to aspects of the present disclosure, in at least one embodiment of the device for holding an RFID device includes a housing having an interior cavity and one open side in communication with the first interior cavity; a base secured at least to the housing, the base having a first side wall and a second side wall and at least one slot extending through the base from the first side wall to the second side wall; a first locking plate configured to fit within the at least one slot from the first side of the base, the first locking member including at least a first sheet portion, at least a first locking member and a first flange located at one edge of the first locking member; and a second locking plate configured to fit within the at least one slot from the second side of the base, the second locking member including at least a second sheet portion, a second locking member and a second flange located at one edge of the second locking member. Accordingly, when the first and second sheet portions of the first and second locking plates are positioned in the at least one slot the first and second sheet portions overlap, and the first flange extends along at least a portion of the first side wall of the base and the second flange extends along at least a portion of the second side wall of the base whereby the first and second flanges are configured to engage the object to be identified.

According to aspects of the present disclosure, in at least one embodiment of the device for holding an RFID device a cover is configured to enclose the interior cavity and has an outer surface, and the base is positioned proximate the cover and extends outwardly from the outer surface of the cover.

According to aspects of the present disclosure, in at least one embodiment of the device for holding an RFID device the first locking member comprises a first bump extending from the first sheet portion and the second locking member of the second sheet portion comprises a second bump extending from the second sheet portion, and the first bump frictionally engages the second bump when the first and second sheet portions of the first and second locking plates are positioned in the at least one slot.

According to aspects of the present disclosure, in at least one embodiment of the device for holding an RFID device the first locking member of the first locking plate is a tab and the second locking member of the second locking plate is a slot, and the tab extends through the slot when the first and second sheet portions are positioned in the at least one slot.

The Summary of the Invention is neither intended nor should it be construed as being representative of the full extent and scope of the present invention. Moreover, reference made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
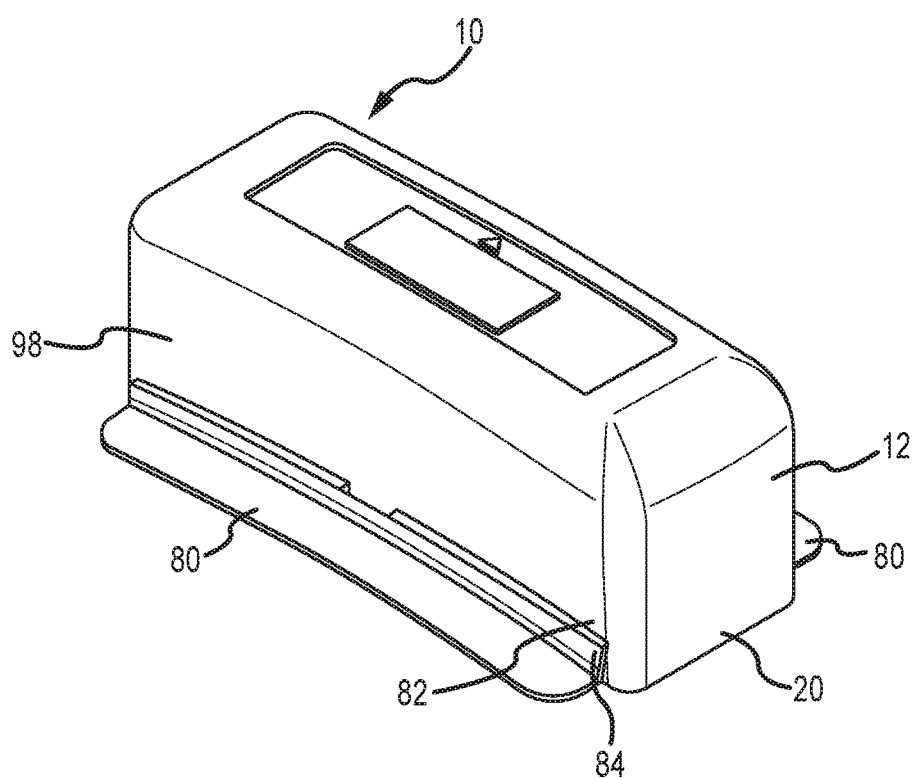
FIG. 1 is a perspective view of one embodiment of a device for holding an identification device.
Figure 2:
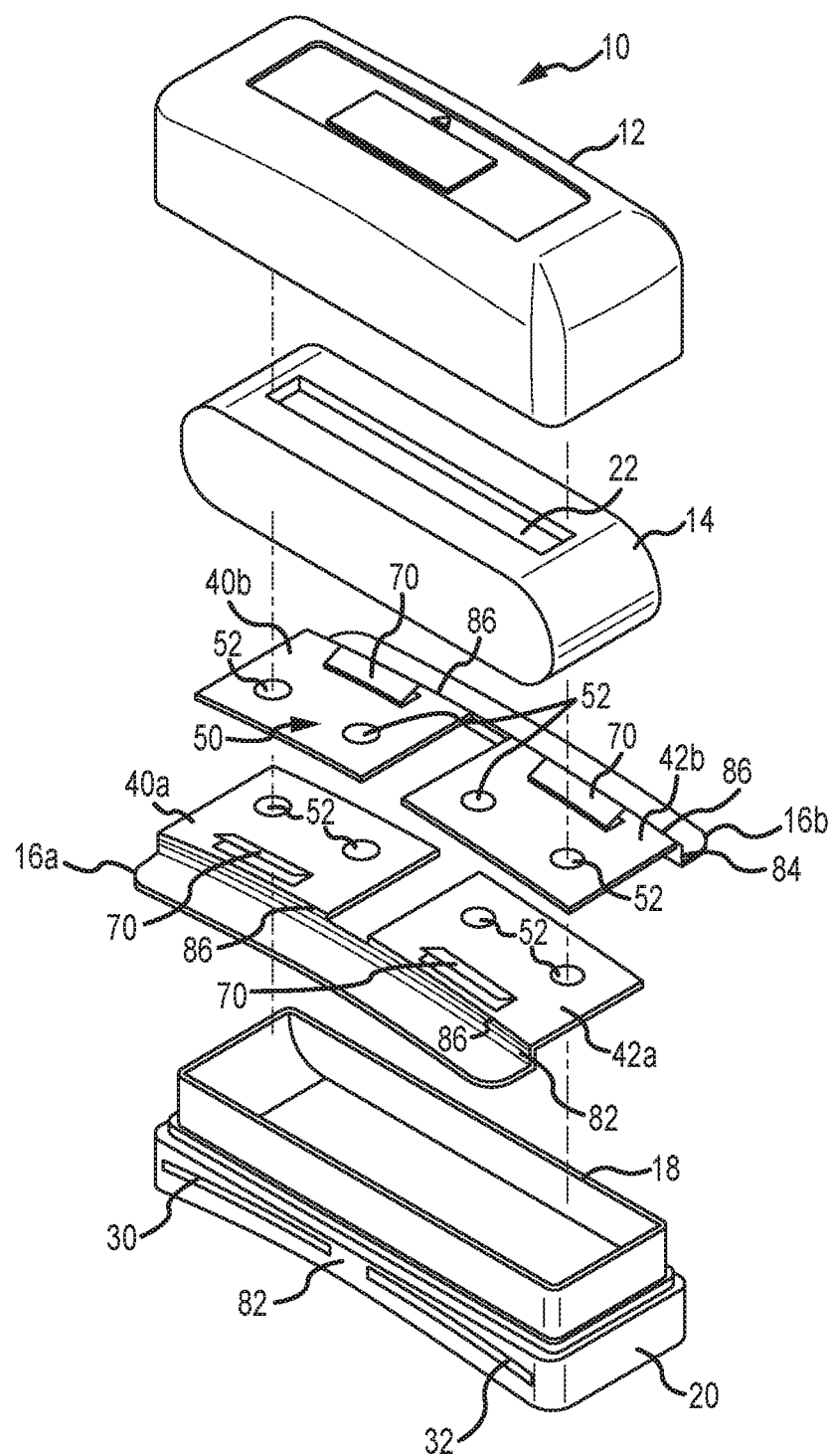
FIG. 2 is an exploded view of the embodiment of FIG. 1.

With reference to FIGS. 1 and 2, a first embodiment of a device 10 for holding an identification device is illustrated. The device includes a housing 12, an inlay holder 14, a pair of locking plates 16a and 16b, a cover 18 and a base 20. The inlay holder 14 is configured to receive a radio frequency transponder or inlay, for example, within recess or slot 22 or interior to the inlay holder 14. As one example, an integrated circuit chip may be positioned in the recess 22 and an antenna, electrically connected to the chip, may be formed around the body of the inlay holder. A patch antenna is another example of an antenna that may be used with this configuration. Those of skill in the art, upon review of the present disclosure, will appreciate other types of transponders may also be utilized.

Figure 3:
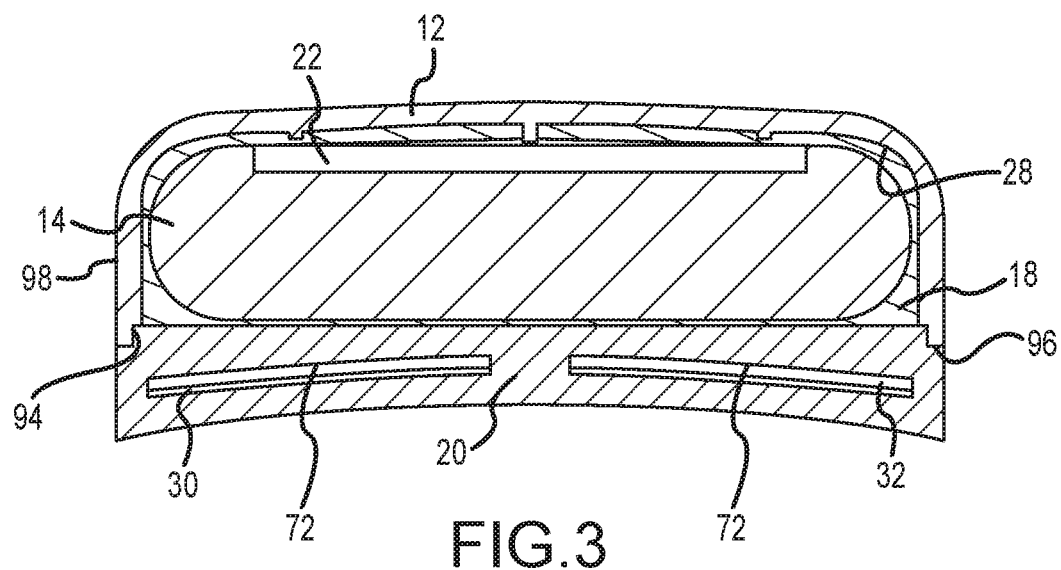
FIG. 3 is a cross section view of the embodiment of FIG. 1 along its long dimension.

The inlay holder 14 is, in turn, positioned inside the interior cavity 24 of the housing 12. With reference to FIG. 3, an adhesive or other material may be used in the space between the inlay holder 14 and the inside surface 26 of the housing 12 to secure the inlay holder 14 against movement within the cavity 24 and thereby reduce possible damage to the transponder or inlay. In addition, the inlay holder 14 may be made from high performance engineering polymers to also absorb shock events to the housing 12. Here the inlay holder 14 is a single unitary piece but may be constructed of multiple pieces. The cover 18 is attached to the housing 12 to enclose the inlay holder 14 and transponder. The base 20 is connected to the cover 18 and housing 12 to securely capture the inlay holder 14 and radio frequency device within the housing 12. In one embodiment, the base 20 is overmolded onto the cover 18 and housing 12. The connection of the base 20 to the cover 18 and housing 12 may be accomplished by other means known to those of skill in the art, including but not limited to adhesives, friction fit, heat, ultrasonic welding, mechanical fasteners, and other methods known to those of skill in the art.

FIG. 2 illustrates the base 20 abutting the cover 18. The cover 18 is illustrated in cross section in FIG. 3 enclosing the inlay holder 14 in the interior 28 of the housing 12. It is within the scope of the present disclosure that the cover 18 and base 20 may be an integral single piece or, alternatively, that the cover may be eliminated and the base secured to the housing without a cover. The base 20 is affixed to the exterior surface 90 and end walls of the cover 18 to secure the transponder or inlay within the housing 12. A notch 94 is formed in the bottom edge 96 of the walls 98 providing additional surface and support for attachment of the base 20. The cover 18 and base 20 may be secured to the housing 12 using adhesives, friction fit, heat, ultrasonic welding, mechanical fasteners and other methods known to those of skill in the art.

As illustrated in FIGS. 2 and 3, the base 20 includes a pair of slots 30 and 32 extending through the base 20 from a first side 34 to the opposite or second side 36. The slots 30, 32 may be planar, substantially planar or curved. It is within the scope of the present disclosure that a single slot is sufficient or two or more slots may be utilized.

A pair of locking plates 16a and 16b are configured to be positioned within the one or more slots 30 and 32. According to one embodiment of the present disclosure, one locking plate 16a is inserted from a first side 34 of the base 20 and the second locking plate 16b is inserted from the second side 36 of the base 20. Each locking plate 16a, 16b includes at least one sheet portion 40a, 42a and 40b, 42b that is inserted into a slot. If the base 20 has two slots 30 and 32, such as illustrated in FIGS. 2 and 3, the locking plate 16a and 16b will include one sheet portion 40a and 40b that are positioned in slot 30 and 42a and 42b that are positioned in slot 32.

Figure 4:
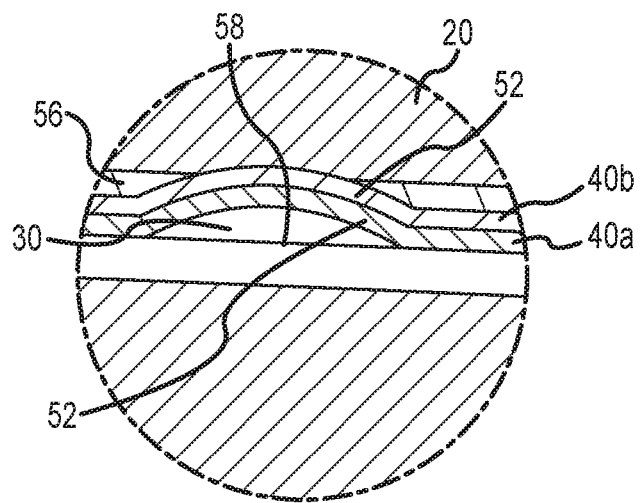
FIG. 4 is an enlarged partial cross section view of the two locking plates of FIG. 2 shown in an overlapping orientation.

Each sheet portion 40 and 42 may optionally include discrete locking members 50. In one embodiment, a first locking member 50 comprises a protrusion, bump or dimple 52 that extends from the sheets 40 and 42. When the locking plates 16a or 16b are inserted into the one or more slots 30 and 32, the respective locking sheets 40a and 40b, and 42a and 42b, overlap within the one or more slots 30 and 32, respectively. The protrusions or bumps 52 are aligned to overlap such that the bumps 52 on one locking sheet portion, for example 40a nest within the bumps 52 on the second sheet 40b and the bumps 52 on locking sheet 42a overlap with the bumps 52 on locking sheet 42b. In this manner, the sheet portions 40a and 40b and 42a and 42b are interconnected or interlocked. In addition, the extent to which the bumps 52 protrude from the sheet portions 40 and 42 may be used to friction fit or wedge the locking sheets into a slot 30 or 32. Interlocking bumps 52 within a slot 30 or 32 are seen in FIG. 4. The friction fit between the individual bumps 52 and between the nested bumps and the opposed surfaces 56 and 58 of the slot 30 and 32 assists in preventing removal of the locking plates 16a and 16b from the one or more slots 30 and 32.

A second locking member 50 may also be associated with the locking sheets 40 and 42 to inhibit or resist removal of the locking plates from the one or more slots. One example of such a second locking member 50 are the tabs 70 shown FIGS. 2, 5 and 6. The tabs 70 extend outwardly from the sheet portions 40 and 42 and deflect toward the sheet portions 40 and 42 when the locking plates 16a and 16b are inserted in a slot 30 and 32. The bias of the tabs 70 is against a surrounding surface 72 of the slots 30, 32 and resists removal of the locking plate 16a and 16b from the slots 30, 32. The tabs 70 may extend in either or both directions away from the sheet portions 40 and 42, i.e., up or down relative to FIG. 6. The locking sheets 40a, 40b, 42a and 42b may include either, both or none of locking members 52 and 70.

Figure 14:
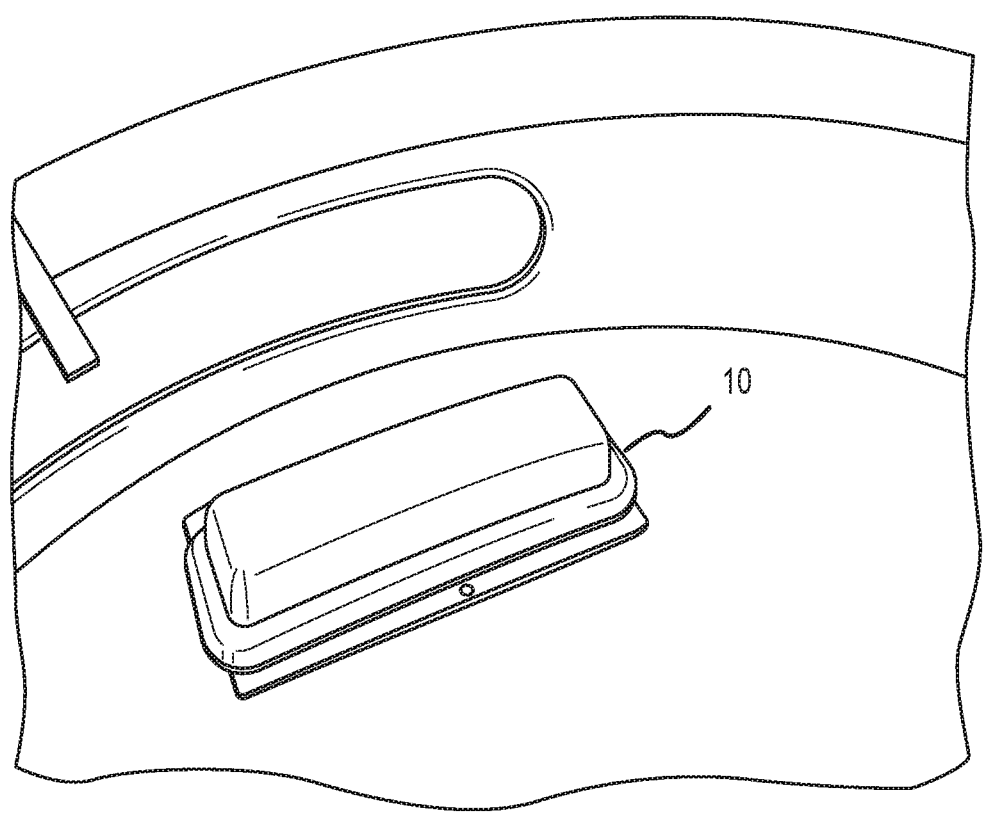
FIG. 14 is a perspective view of an embodiment of a device for holding an identification device secured to a beer keg.

Each locking plate 16a, 16b further includes a flange or wing 80 that is configured to extend along the side wall 82 of the base 20 or the cover 18. A band 84 of material connects the flange 80 to the outer edge 86 of the sheet portions 40 and 42. The dimension of the interconnecting band 84 may be altered for purposes of positioning the flange 80 in alignment with the contour of the object to which the device 10 will be attached. For example, the position and contour of the flange 80 may align with the contour of the outer surface of the base 20 to interface with the surface of the object to be identified. In the case of a beer keg having a curved or cylindrical exterior surface, the flange 80 may be shaped to mirror the shape or contour of the beer keg to facilitate attachment of the device to the keg (see, FIG. 14). Because most beer kegs are made of stainless steel, making the locking plate of stainless steel facilitates welding of the flanges to the surface of the keg. Of course, the locking plates may be made of any other material that is appropriate for the particular application.

Figure 7:
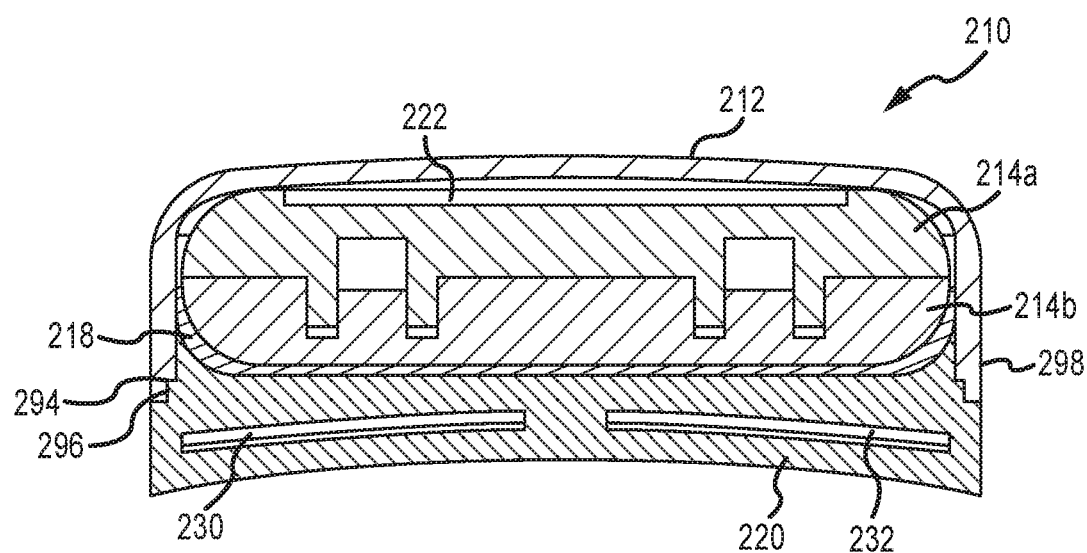
FIG. 7 is a cross section of a second embodiment of a device for holding an identification device.
Figure 8:
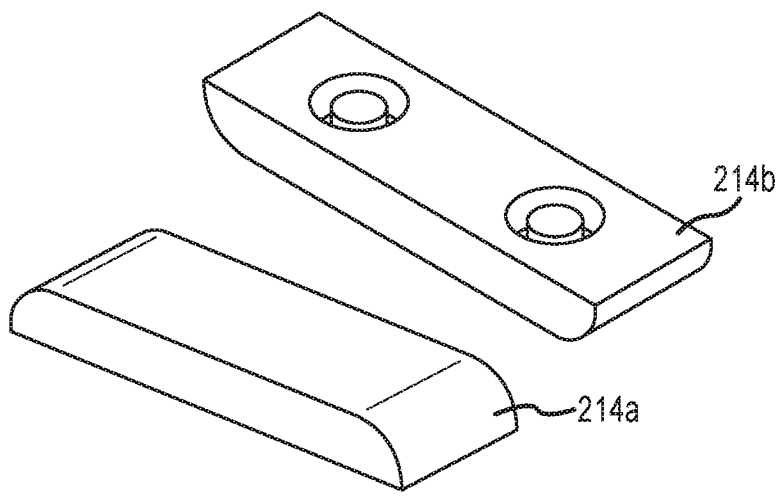
FIG. 8 is a disassembled bottom view of a second embodiment of an inlay holder.
Figure 9:
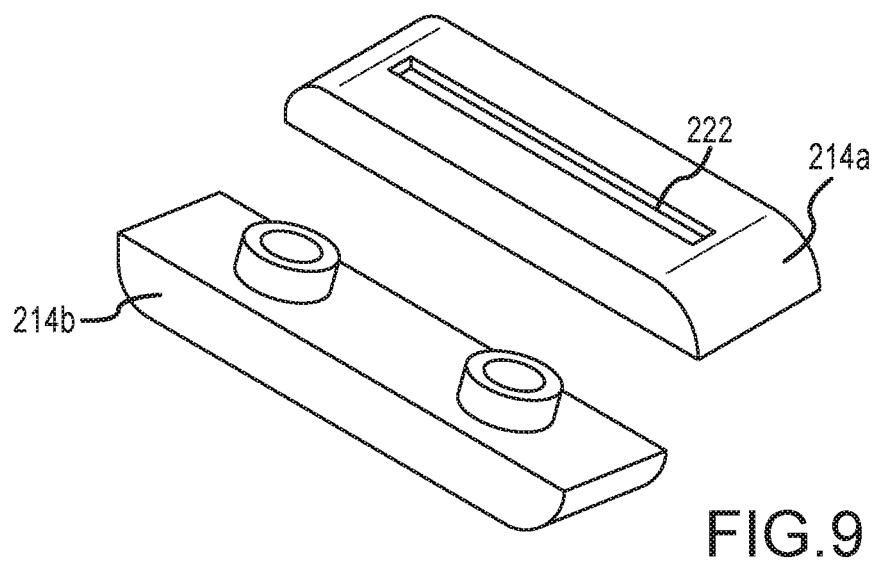
FIG. 9 is a disassembled top view of the inlay holder of FIG. 8.

FIG. 7 is a cross section of a second embodiment of a device 210 for holding an identification device. Here, the inlay holder 214 is made from two separate pieces 214a and 214b joined together. The separate portions 214a and 214b of the holder 214 are further shown in FIGS. 8 and 9. Slot or channel 222 is shown in FIG. 9 for receiving a transponder or inlay. As a further alternative, the inlay holder may have a hollow interior or interior cavity (not shown) to receive the transponder or inlay.

A benefit of using a multi-piece inlay holder is to facilitate the injection of such thick plastic parts, improving cycle time and better controlling or avoiding plastic shrinking effect. Maintaining the shape of the inlay holder as designed insures the stability of the antenna tuning. Having multiple pieces provides flexibility in designing and making a cavity or cavities inside the holder to lower the quantity of plastic, thus lowering cost and/or weight, or better absorb shocks, or tune the antenna using particular plastic patterns (i.e., a honeycomb design). However, a single piece inlay holder is also acceptable depending on system requirements.

Figure 10:
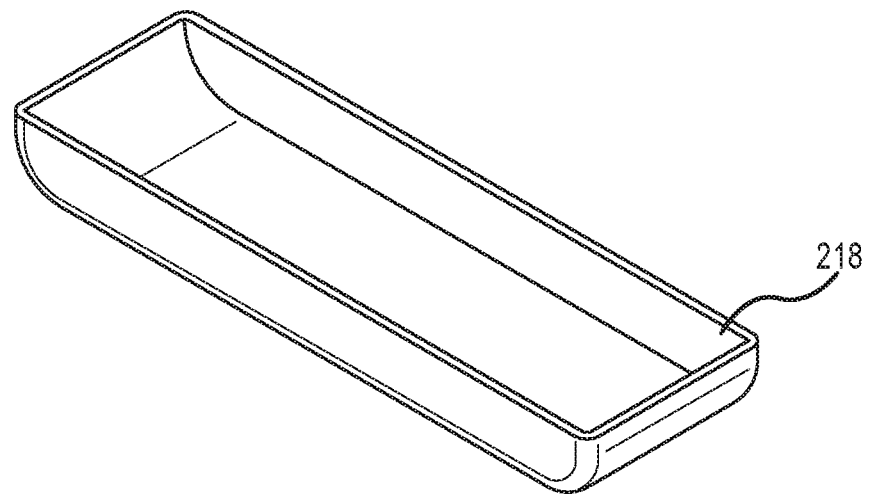
FIG. 10 is a perspective view of a second embodiment of a cover.
Figure 11:
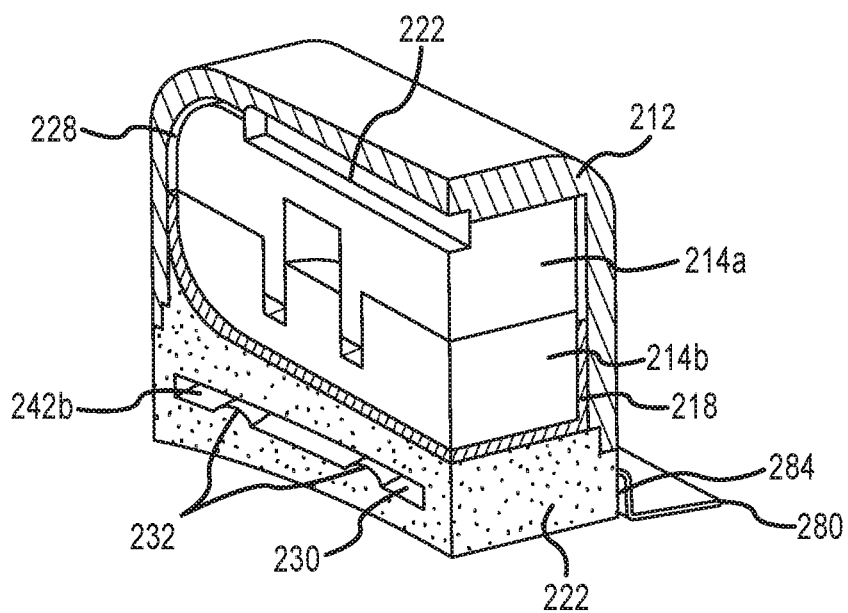
FIG. 11 is dual cross section view, taken along perpendicular axes, of the embodiment of FIG. 7.

A second embodiment of a cover 218 is illustrated in FIG. 10. The cover 218 is closed on all sides but one, which is open to fit over the inlay holder 214. The cover 218 is illustrated in cross section in FIG. 7 enclosing the inlay holder 214 in the interior 228' of the housing 212. The base 220 is affixed to the exterior surface 290 and end walls 292 of the cover 218 to secure the transponder or inlay within the housing. FIG. 11 illustrates a dual cross-section of the assembled device 210 of FIG. 7. In this embodiment, a notch 294 is formed in the bottom edge 296 of the walls 298 of the housing 212 providing additional surfaces and support for attachment of the base 220. The cover 218 and base 220 may be secured to the housing 212 using adhesives, friction fit, heat, ultrasonic welding, mechanical fasteners and other methods known to those of skill in the art. Additionally, ribs 232 may be formed in the slots 230 to facilitate interlocking of the sheet portions.

Figure 12:
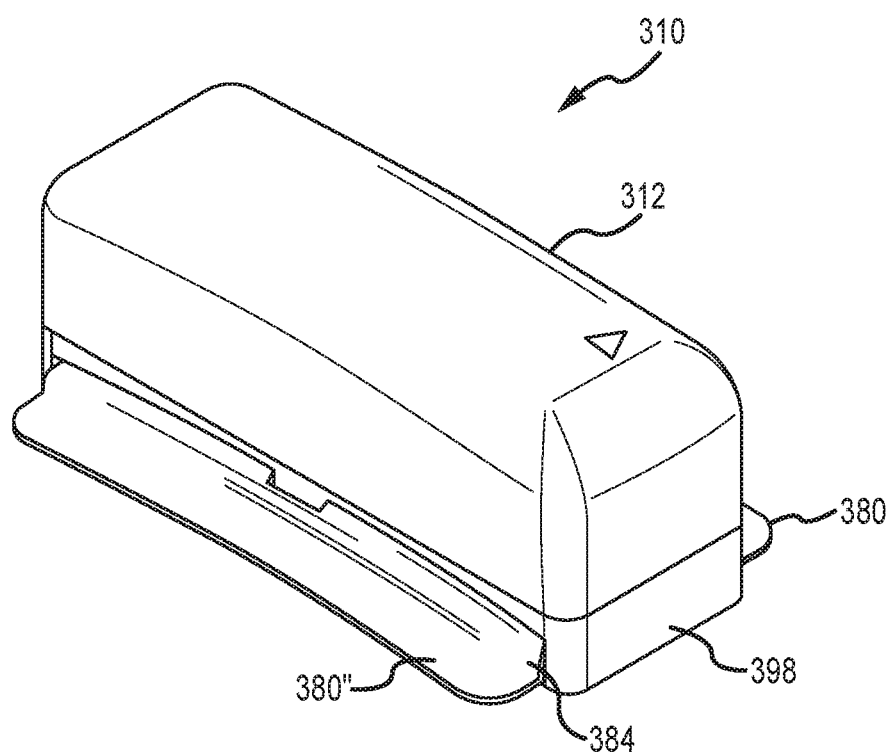
FIG. 12 is a perspective view of third embodiment of a device for holding an identification device.
Figure 13:
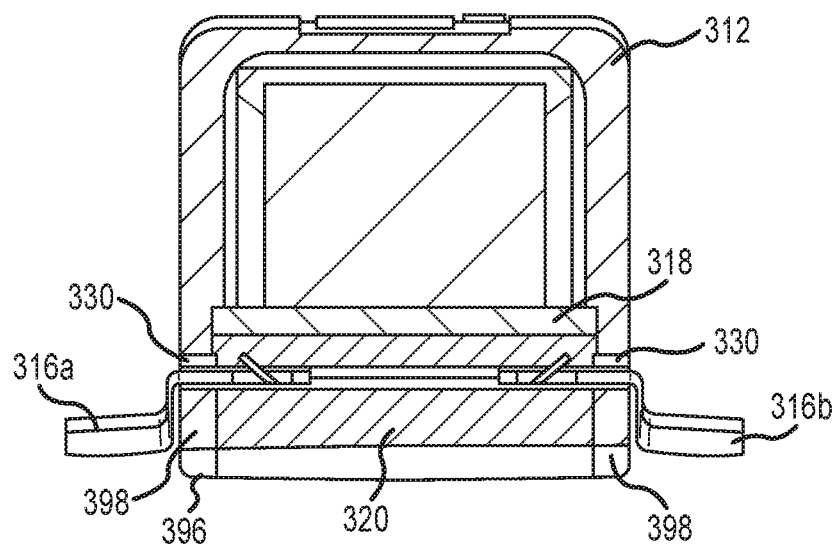
FIG. 13 is a cross section view of the embodiment of FIG. 12.

FIGS. 12 and 13 illustrate another alternative embodiment according to aspects of the present disclosure. In this embodiment, the walls 398 of the housing are longer or deeper and the base 320 is positioned between the walls 398 of the housing, rather than extending beyond or below the walls 98 and 298 of the housing as shown in FIGS. 3 and 7, respectively. As shown in FIG. 13, slots 330 are formed in the walls 398 of the housing as well as in the base 320 and the locking plates 316a and 16b extend through the slots 330 in the housing and the base 320.

Figure 15A:
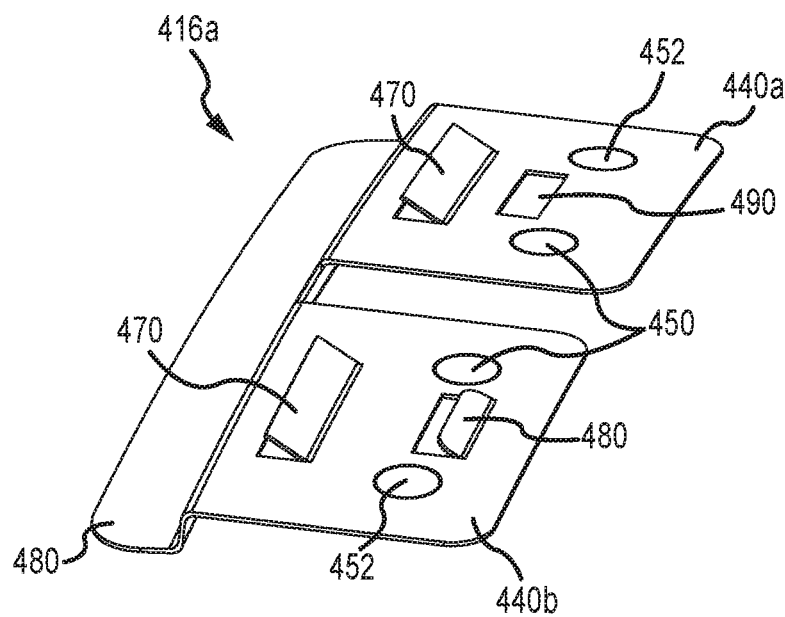
FIG. 15A is a perspective view of an embodiment of a first locking plate.
Figure 15B:
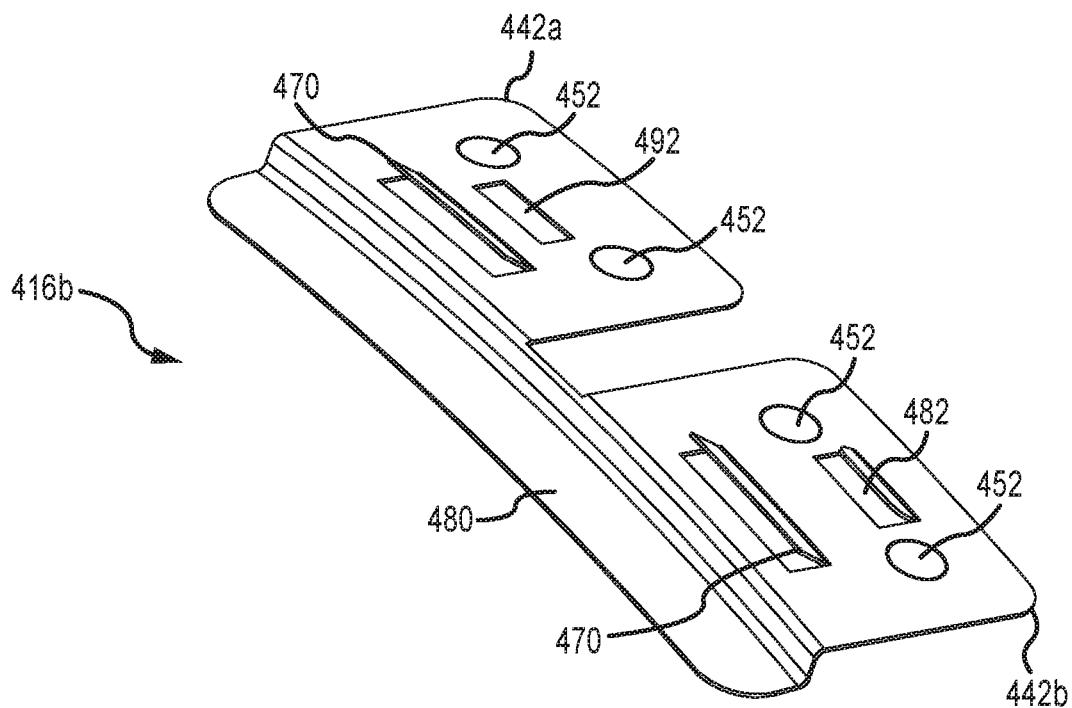
FIG. 15B is a different perspective view of the embodiment of a locking plate illustrated in FIG. 15A.
Figure 16:
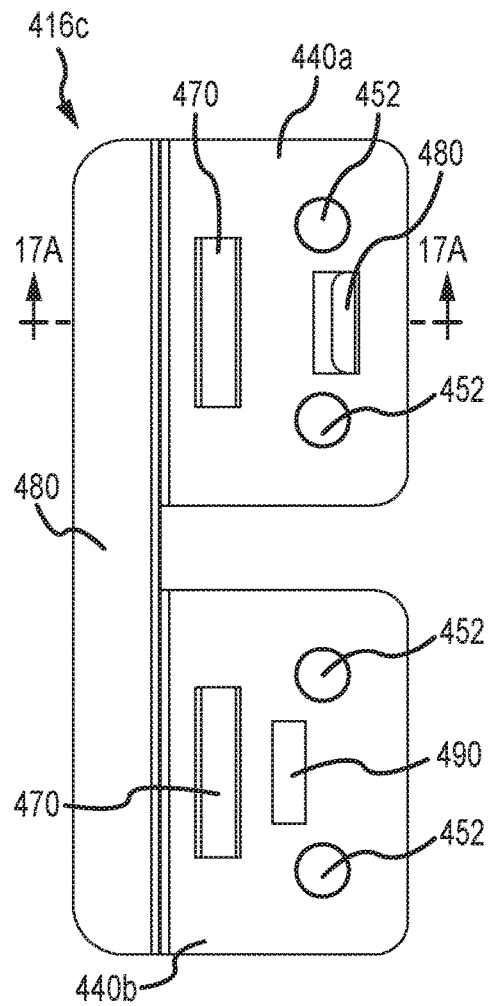
FIG. 16 is a top view of the embodiment of the locking plate illustrated FIGS. 15A and B.

An alternative embodiment of a locking plate 416 is illustrated in FIGS. 15A-17B. The locking plate 416a illustrated in FIG. 15A is identical to the locking plate 416b illustrated in FIG. 15B. Each locking plate 416a and 416b includes at least one sheet portion 440a and 440b and 442a and 442b, respectively, that are inserted into a slot of a base. As noted with previous embodiments, each locking plate 416 may include one, two or more sheet portions 440a, 440b . . . 440n provided the base includes a sufficient number of slots to receive the sheet portions. As with the prior embodiment(s) locking members in the form of protrusions or bumps 452 may be included or not included. Similarly, locking tabs 470 may optionally be included or not.

Unique to this embodiment are a second set of locking tabs 480 and 482 and a complementary aperture or slot 490 and 492 formed in the sheet portions 440 and 442 respectively. As part of installation process, locking plate 416b would be rotated approximately 180 degrees from the orientation illustrated in FIG. 15B and the two locking plates would be inserted into slots in a base from opposite sides of the base. More specifically, sheet portion 442a of locking plate 416b is positioned underneath sheet portion 440a of locking plate 416a and sheet portion 440b of locking plate 416a is placed underneath sheet portion 442b of locking plate 416b. In this manner, locking tab 482 deploys in slot 490 and locking tab 480 deploys in slot 492. This construction provides a further impediment to separating locking plate 416a from 416b once installed.

Figure 17A:
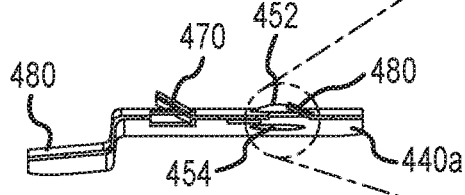
FIG. 17A is a cross-section of the locking plate of FIG. 16, taken along line 17A-17A.
Figure 17B:
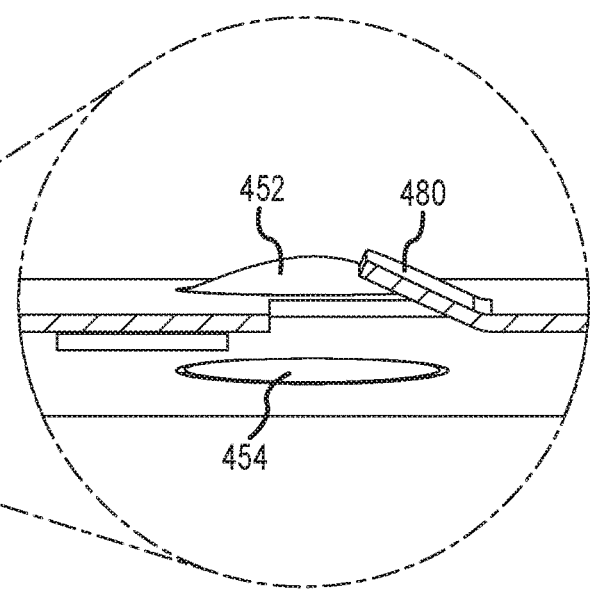
FIG. 17B is an enlarged section view of a portion of FIG. 17A.

As a further alternative, instead of forming nesting dimples 52 on the sheet portions as shown in FIG. 4, one of the nesting dimples 452 may be replaced with an aperture or hole 454 in the sheet member. This is illustrated in FIGS. 17A and B. Accordingly, the dimple 452 would be formed in the underlying sheet portion and the aperture 454 would be formed in an overlying sheet portion such that the dimple 452 would protrude through the aperture 454 and the edge of the aperture would abut the outer or protruding surface of the dimple to resist separation of the interlocking sheet portions.

Figure 18:
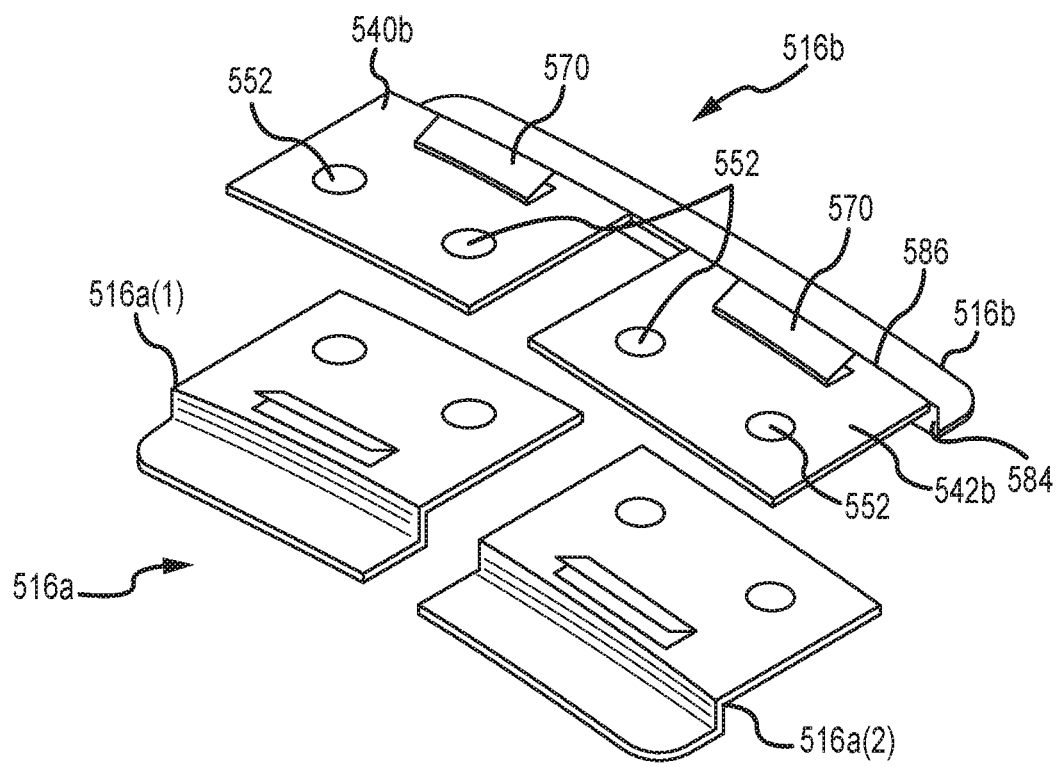
FIG. 18 is a perspective view of an alternative embodiment of the locking plates illustrated in FIG. 2.

FIG. 18 illustrates an alternative embodiment of the locking plates 16a and 16b shown in FIG. 2. Here, locking plate 516a comprises two discrete locking plates 516a(1) and 516a(2), while locking plate 516b remains a single piece. It should be appreciated that locking plate 516b may also comprise multiple locking plates instead of a single piece. It should also be appreciated that a locking plate may comprise more than two sheet portions, for example three, four or more.

Figure 19:
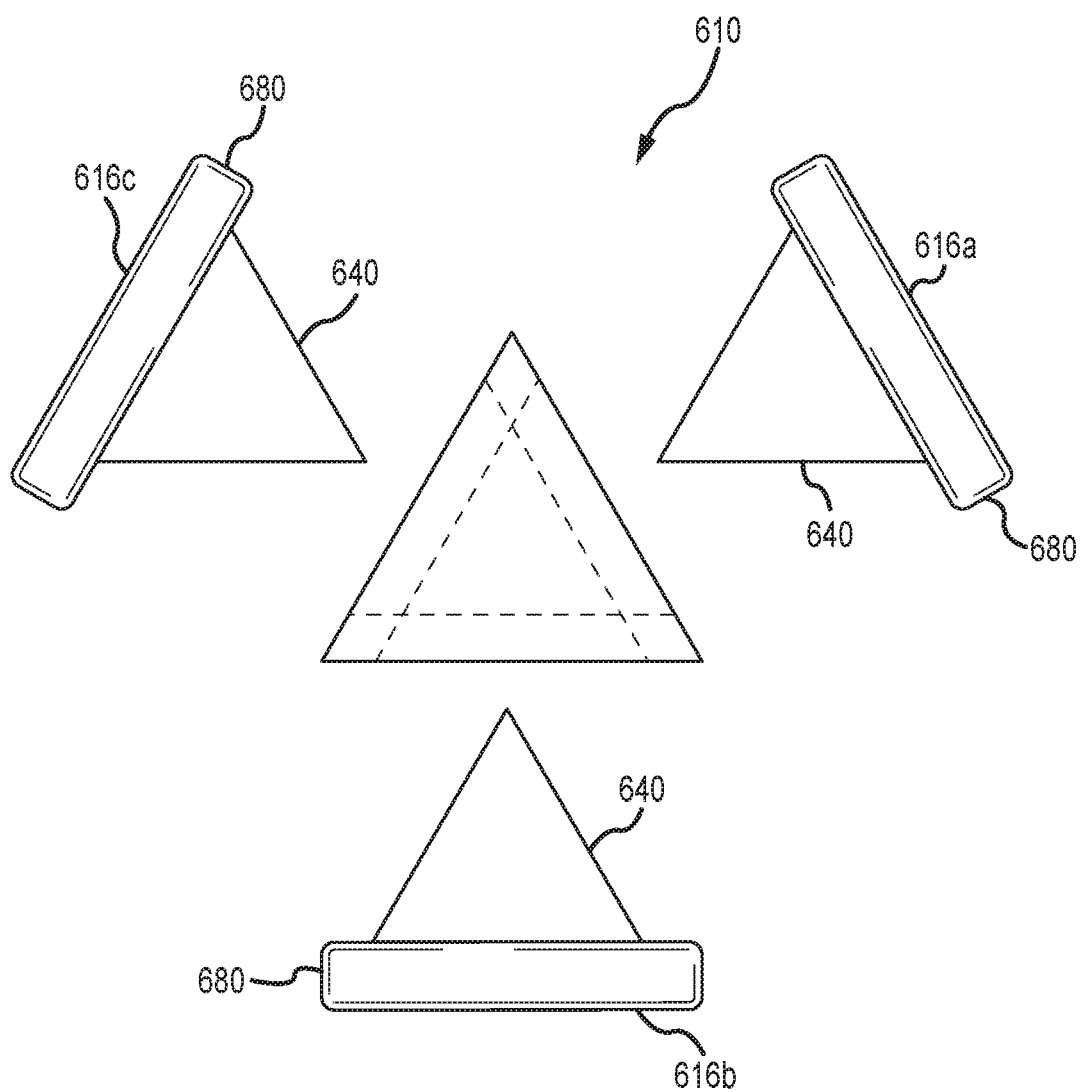
FIG. 19 is a top view of an embodiment of a device for holding an identification device.
Figure 20:
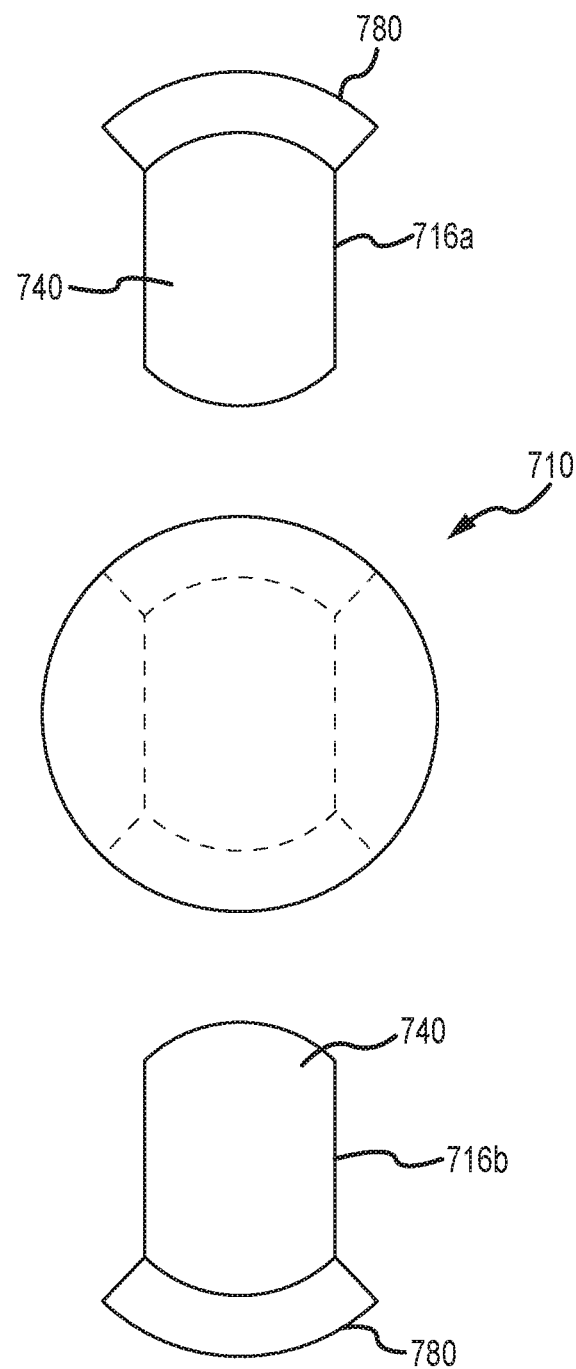
FIG. 20 is a top view of an embodiment of a device for holding an identification device.

It should also be appreciated that the housing need not be a rectilinear cube, such as housing 12 illustrated in FIG. 2 but could be almost any shape as appropriate for the shape of the object to be identified or an may be appropriate to accommodate the shape of a particular RFID device. FIGS. 19 and 20 illustrate other alternatively shaped housings that are also within the scope of the present disclosure. FIG. 19 illustrates a housing 610 having a triangular cross-section, such as a pyramid and FIG. 20 illustrates a housing 710 having a hemi-spherical shape. As will be appreciated by those of skill in the art upon review of the present disclosure, the locking plates are reconfigured to match the cross-sectional shape of the housing. For example, In FIG. 19, each locking plate 616 includes a linear flange 680 and a triangular shaped sheet portion 640. In FIG. 20, each locking plate 716 includes a curved flange 780 and a sheet portion 740 having a profile that matches the cross-sectional shape of the housing 710. Although not illustrated, the sheet portions 640 and 740 would include some or all of the various locking features described herein with respect to the other embodiments for interlocking the sheet portions together and relative to an associated base.

Figure 5:
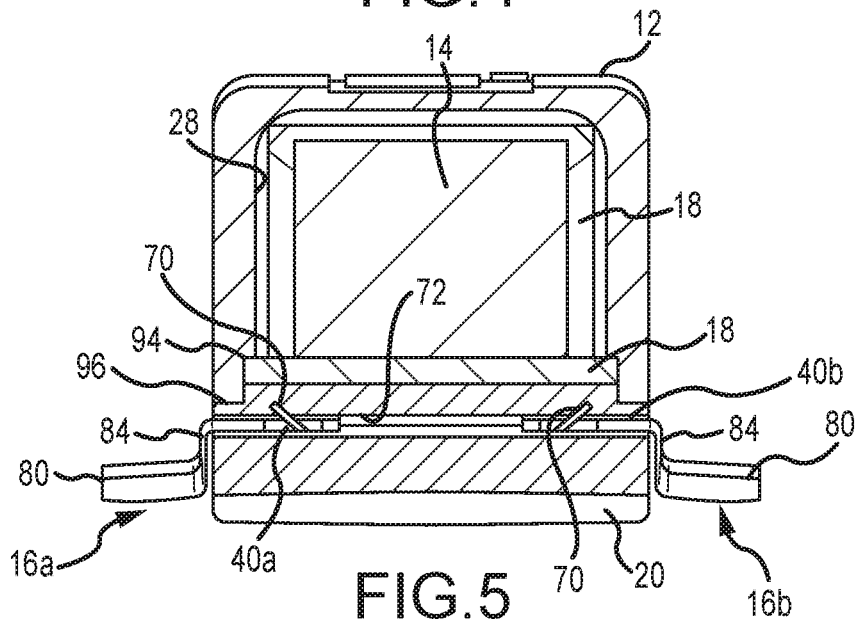
FIG. 5 is a cross section of the embodiment of FIG. 1 along its short dimension.
Figure 6:
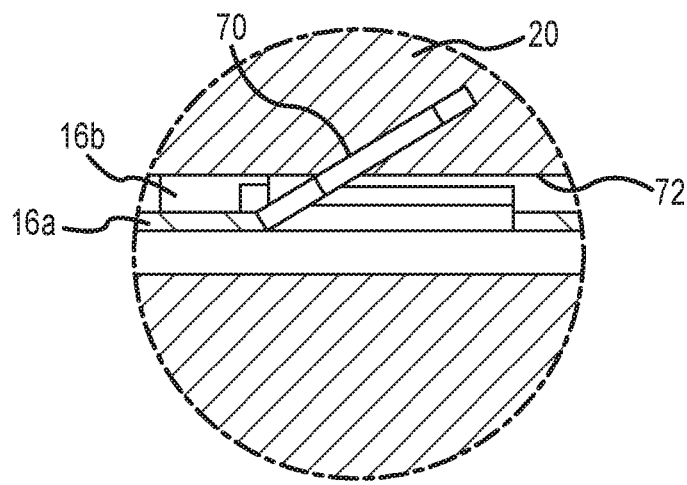
FIG. 6 is an enlarged partial cross section view of a locking tab of a locking member of FIG. 2.

While various embodiments of the present invention have been described in detail, it is apparent that modifications and alterations of those embodiments will occur to those skilled in the art. For example, instead of using multiple locking plates 16 interconnected within one or more slots 30 formed in a base 20 as illustrated in FIG. 5, according to aspects of the present disclosure a single locking plate could be utilized and the base molded around it. The single locking plate would have at least one exterior flange on opposite sides of the base for attachment to the object to be identified, and at least one sheet portion extending between the exterior flanges. The base would be molded around the one or more sheet portions extending between the exterior flanges. There would be no interlocking or mating sheet portions and, therefore, no need for the various sheet portion locking features described herein. However, it is to be expressly understood that such modifications and alterations are within the scope and spirit of the present invention, as set forth in the following claims. Other modifications or uses for the present invention will also occur to those of skill in the art after reading the present disclosure. Such modifications or uses are deemed to be within the scope of the present invention.

What is claimed is:

1. A device for holding a radio frequency identification device, comprising:
    a housing having a first interior cavity and one open side in communication with the first interior cavity;
    a cover having an inner surface and an outer surface and configured to enclose the first interior cavity;
    a base extending from the outer surface of the cover and secured at least to the housing, the base having an outer surface configured to interface with an object to be identified, the base further having two opposed and spaced apart side walls and two opposed and spaced apart end walls extending between the side walls, and at least one slot extending through the base from a first side wall to the opposite side wall;
    a first locking plate configured to fit within the at least one slot from the first side wall of the base, the first locking plate having at least a first sheet portion, a first locking member, a second locking member, and a first flange extending along one edge of the first sheet portion; and
    a second locking plate configured to fit within the at least one slot from the opposite side wall of the base, the second locking plate having at least a second sheet portion, a third locking member, a fourth locking member, and a second flange extending along one edge of the second sheet portion;
    wherein, when the first and second sheet portions of the first and second locking plates are positioned in the at least one slot the first and second sheet portions overlap, and the first flange extends along at least a portion of the first side wall of the base and the second flange extends along at least a portion of the opposite side wall of the base whereby the first and second flanges are configured to engage the object to be identified.

2. The device of claim 1, wherein the first sheet portion of the first locking plate comprises at least the first locking member and the second sheet portion of the second locking member comprises at least the third locking member, and wherein, when the first and second sheet portions of the first and second locking plates are positioned in the at least one slot the first locking member of the first locking plate interlocks with the third locking member of the second locking plate to secure the first and second locking plates together.

3. The device of claim 2, wherein the first locking member comprises a first bump extending from the first sheet portion and the third locking member of the second sheet portion comprises a second bump extending from the second sheet portion, and wherein the first bump frictionally engages the second bump.

4. The device of claim 3, wherein at least one of the first and second bumps frictionally engages a surface of the at least one slot.

5. The device of claim 3, wherein the bumps are partially spherical.

6. The device of claim 2, further comprising multiple first locking m tubers associated with the first sheet portion and multiple third locking members associated with the second sheet portion.

7. The device of claim 2, wherein the first locking member of the first locking plate is a tab and the third, locking member of the second locking plate is a slot, and wherein the tab extends through the slot when the first and second sheet portions are positioned in the at least one slot.

8. The device of claim 1, wherein the first sheet portion of the first locking plate comprises at least the second locking member and the second sheet portion of the second locking member comprises at least the fourth locking member, and wherein, when the first and second sheet portions of the first and second locking plates are positioned in the at least one slot the second locking member of the first locking plate and the fourth locking member of the second locking plate frictionally engage a surface of the slot to inhibit removal of the first and second locking members from the at least one slot.

9. The device of claim 1, wherein the at least one slot comprises multiple slots extending through the base from the first side wall to the opposite side wall, and wherein the first and second locking plates each comprise multiple sheet portions, and wherein at least one sheet portion of the first locking plate overlaps with at least one sheet portion of the second locking plate and wherein at least one of the overlapping sheet portions comprises at least one of the locking members to secure the first locking plate to the second locking plate.

10. The device of claim 9, wherein each of the multiple sheet portions of the first locking plate overlaps with a corresponding sheet portion of the second locking plate.

11. The device of claim 10, wherein at least a plurality of the multiple sheet portions of the first locking plate each comprise a locking member that engages a corresponding locking member associated with a corresponding sheet portion of the second locking plate.

12. The device of claim 1, further comprising multiple second locking members associated with the first sheet portion and multiple fourth locking members associated with the second sheet portion.

13. The device of claim 1, further comprising a radio frequency identification device positioned in the first cavity.

14. The device of claim 1, wherein the outer surface of the base is curved.

15. The device of claim 1, the first and second sheet portions are substantially planar.

16. A device for holding a radio frequency identification device, comprising:
   a housing having an interior cavity and one open side in communication with the first interior cavity;
   a base secured at least to the housing, the base having a first side wall and a second side wall and at least one slot extending through the base from the first side wall to the second side wall;
   a first locking plate configured to fit within the at least one slot from the first side of the base, the first locking plate comprising at least a first sheet portion, at least a first locking member, and a first flange located at one edge of the first locking plate; and
   a second locking plate configured to fit within the at least one slot from the second side of the base, the second locking plate, comprising at least a second sheet portion, a second locking member, and a second flange located at one edge of the second locking plate;
   wherein, when the first and second sheet portions of the first and second locking plates are positioned in the at least one slot the first and second sheet portions overlap, and the first flange extends along at least a portion of the first side wall of the base and the second flange extends along at least a portion of the second side wall of the base whereby the first and second flanges are configured to engage the object to be identified.

17. The device of claim 16, further comprising a cover configured to enclose the interior cavity and having an outer surface, and wherein the base is positioned proximate the cover and extends outwardly from the outer surface of the cover.

18. The device of claim 17, wherein the first locking member comprises a first bump extending from the first sheet portion and the second locking member comprises a second bump extending from the second sheet portion, and wherein the first bump frictionally engages the second bump when the first and second sheet portions of the first and second locking plates are positioned in the at least one slot.

19. The device of claim 17, wherein the first locking member of the first locking plate is a tab and the second locking member of the second locking plate is a slot, and wherein the tab extends through the slot when the first and second sheet portions are positioned in the at least one slot.

20. The device of claim 16, wherein when the first and second sheet portions of the first and second locking plates are positioned in the at least one slot the first locking member and the second locking member frictionally engage a corresponding surface of the slot to inhibit removal of the first and second locking members from the at least one slot.

* * * * *